United States Patent [19]

Beach et al.

[11] Patent Number: 5,623,398
[45] Date of Patent: Apr. 22, 1997

[54] SERIES CONNECTED CONVERTER FOR CONTROL OF MULTI-BUS SPACECRAFT POWER UTILITY

[75] Inventors: Raymond F. Beach, North Olmsted; Andy Brush, Chagrin Falls, both of Ohio

[73] Assignee: The United States of America as represented by the Administrator of the National Aeronautics and Space Administration, Washington, D.C.

[21] Appl. No.: 550,324

[22] Filed: Oct. 30, 1995

[51] Int. Cl.⁶ .................................................. H02M 7/00
[52] U.S. Cl. .................................................. 363/65; 363/71
[58] Field of Search .................................. 363/65, 71, 97, 363/131; 323/906; 307/45, 70, 82

[56] References Cited

U.S. PATENT DOCUMENTS

| | | |
|---|---|---|
| 3,480,789 | 11/1969 | Binckley et al. . |
| 3,740,636 | 6/1973 | Hogrefe et al. . |
| 3,965,409 | 6/1976 | Klautschek .......................... 363/124 |
| 4,245,286 | 1/1981 | Paulkovich et al. . |
| 4,494,063 | 1/1985 | Callen et al. . |
| 4,644,247 | 2/1987 | Burmenko . |
| 4,691,159 | 9/1987 | Ahrens et al. . |
| 4,706,010 | 11/1987 | Callen et al. . |
| 5,530,635 | 6/1996 | Yashiro ................................ 363/65 |
| 5,546,299 | 8/1996 | Lenz .................................... 363/71 |
| 5,548,504 | 8/1996 | Takehara ............................. 363/65 |

Primary Examiner—Matthew V. Nguyen
Attorney, Agent, or Firm—Kent N. Stone

[57] ABSTRACT

The invention provides a power system using series connected regulators. Power from a source, such as a solar array, is processed through the regulators and provided to corresponding buses used to charge a battery and supply loads. The regulators employ a bypass loop around a DC—DC converter. The bypass loop connects a hot input of the converter to a return output, preferably through an inductor. Part of the current from the source passes through the bypass loop to the power bus. The converter bucks or boosts the voltage from the source to maintain the desired voltage at the bus. Thus, only part of the power is processed through the converter. The converter can also be used without the bypass loop to provide isolation. All of the converters can be substantially identical.

4 Claims, 2 Drawing Sheets

SERIES CONNECTED CONVERTER FOR CONTROL OF MULTI-BUS SPACECRAFT POWER UTILITY

ORIGIN OF THE INVENTION

The invention described herein was made by employees of the U.S. Government and may be manufactured and used by or for the Government for Government purposes without the payment of any royalties thereon or therefor.

BACKGROUND OF THE INVENTION

1. Field of the Invention

This invention relates generally to the field of power conversion and regulation and specifically to a power converter and system employing the converter.

2. Description of the Related Art

Spacecraft and other apparatus requiring electrical power are commonly provided with direct current power supply systems. A battery, generator, solar array, or other power source provides power to one or more buses at voltages required by various loads. Typically, power is processed through a converter that converts voltage from the source to a desired voltage and may also regulate the voltage and isolate the load from the source. For example, spacecraft use power from a solar array to charge a battery through a regulating converter. Power from the battery is supplied to high and low voltage buses through separate converters processing all of the power to! the buses. Processing full power generates substantial losses, taxing cooling systems and requiring cooling to be sized for relatively high peak loads. The converters must be sized to handle the full power of the power supply system.

U.S. Pat. Nos. 3,480,789 to Binckley and U.S. Pat. No. 4,245,286 to Paulkovich show voltage regulators. U.S. Pat. No. 4,644,247 to Burmenko shows a regulated battery charging circuit. U.S. Pat. Nos. 3,740,636 to Hogrefe, U.S. Pat. No. 4,494,063 to Callen, U.S. Pat. No. 4,691,159 to Ahrens, U.S. Pat. No. 4,706,010 to Callen show power systems associated with solar cells, particularly for spacecraft.

SUMMARY OF THE INVENTION

The present invention provides a power supply system including an input bus, an output bus, and a return. The system is adapted for having a load connected between the output bus and the return. A power converter has a hot input connected to the input bus, a hot output connected to the output bus, a return input connected to the return, and a return output. A bypass loop connects the return output to the input bus.

An inductor is connected in the bypass loop. A fuse is connected between the input bus and the hot input. A power source, such as a solar array, is connected to the input bus and the return. The power source can also be a battery or another bus.

The system can also include a second output bus. The system is adapted for having a second load connected between the:second output bus and the return. A second power converter has a second hot input connected to the first output bus, a second hot output connected to the second output bus, a second return input connected to the return, and a second return output. A second bypass loop connecting the second return output to the first output bus. An inductor is connected in the second bypass loop. A first fuse is connected between the input bus and the first hot input. A second fuse is connected between the first output bus and the second hot input.

The system also includes a third output bus. A third power converter has a third hot input connected to the second output bus, a third return input connected to the return, a third hot output connected to the third output bus, and a third return output. The system is adapted for having a third load connected between the third output bus and the return the third return output. The third converter is an isolating converter.

The invention also provides a regulator that can be used in the power supply system according to the invention, for example, The regulator includes a converter having a hot input connection; a return input connection; a hot output connection; and a return output connection. The bypass loop connects the return output to the hot input connection. The inductor is connected in the bypass loop between the hot input connection and the return output connection. The converter includes a transformer with a secondary having a center tap, the return output being connected to the center tap. A pair of rectifiers are connected to outputs of the transformer. An LC filter is connected at the output of the transformer. A first pair of switches is adapted for alternately connecting the hot input connection to inputs of the transformer. A second pair of switches is adapted for alternately connecting the return input connection to the inputs of the transformer. An inverter control is adapted for alternately closing one of each pair of switches to alternately connect the hot input and return input to opposite inputs of the transformer. A LC filter is connected at the input connection. The converter is an isolating converter.

The system and regulator according to the invention permits use of smaller converters for a given load. Losses are reduced and remain relatively constant for more efficient power conversion and cooling.

DESCRIPTION OF THE PREFERRED EMBODIMENTS

Figure 1:
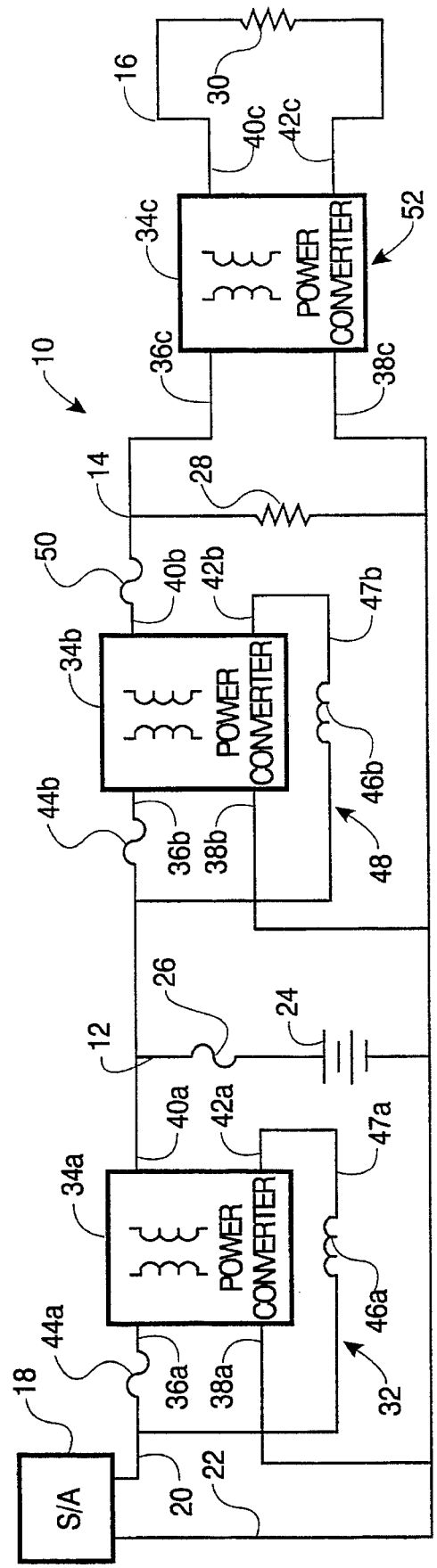
FIG. 1 shows a schematic diagram of a satellite power supply system according to the invention.

Referring to FIG. 1, a direct current; power supply system 10 is adapted for use in a spacecraft, such as a satellite, or other apparatus requiring DC power. The system 10 includes a battery bus 12, a high voltage bus 14, and a low voltage bus 16. "High" and "low" are relative terms for the particular application. Power is derived from a solar array 18 or other suitable source of direct current. The solar array 18 has a hot output 20 preferably providing positive direct current at about 130 volts open circuit with a short circuit current of about 102.5 amps. In a spacecraft application, the solar array voltage will typically fall from 130 volts to about 90 volts during loading. Another output of the solar array 18 defines a return 22, known in some systems as a common or ground.

A storage battery 24 is connected between the battery bus 12 and the return 22, preferably through a fuse 26. The battery is of any suitable type. In the spacecraft system 10, the battery 24 provides about 90 to 120 volts. High voltage loads 28 are connected between the high voltage bus 14 and the return 22 through suitable distribution means. The high voltage bus 14 provides about 120 volts DC to the high voltage loads. Low voltage loads 30 are connected to the high voltage bus 16, which is adapted to provide about 28 volts DC through suitable distribution means.

A battery charger 32, such as a voltage regulator, is connected to provide power to the battery bus 12 at about 90 to 120 volts for charging the battery 24. The battery charger 32 includes a first power converter 34a having a hot input 36a, a return input 38a, a hot output 40a, and a return output 42a. The hot input 36a is connected to the solar array hot output 20 through a fuse 44a. The return input 38a is connected to the return 22. The hot output 40a is connected to the battery bus 12. The return output 42a is connected to the hot input 36a through the fuse 44a and an inductor 46a in a bypass loop 47a, that is, the inductor is connected to the solar array hot output 20. The power converter 34a is described below with reference to FIG. 2.

A high voltage bus regulator 48 is connected to provide power to a constant regulated high voltage bus 14. The high voltage bus regulator 48 includes a second power converter 34b having a hot input 36b, a return input 38b, a hot output 40b, and a return output 42b. The hot input 36b is connected to the battery bus 12 through a fuse 44b. The return input 38b is connected to the return 22. The hot output 40b is connected to the high voltage bus 14, preferably through a fuse 50. The return output 42b is connected to the hot input 36b through an inductor 46b in a bypass loop 47b, that is, the inductor is connected to the battery bus 12. Thus, the battery charger 32 and high voltage bus regulator 48 are series connected. The power converter 36b is described below with reference to FIG. 2.

A low voltage bus regulator 52 is Connected to provide power to the low voltage bus 16. The low voltage bus regulator 52 includes a third power converter 34c having a hot input 36c, a return input 38c, a hot output 40c, and a return output 42c. The hot input 36c is connected to the high voltage bus 14. The return input 38c is connected to the return 22. The hot output 40c is connected to the low voltage bus 16. The return output 42c is connected to the low voltage loads 30 as a low voltage return. The power converter 36c is described below with reference to FIG. 2.

Any suitable DC—DC power converter having desired isolation and voltage characteristics is suitable for use as the power converters 34a, 34b, 34c. Preferably, all of the power converters 34a, 34b, 34c are substantially identical. Thus, the converters are interchangeable providing economies of scale and fewer replacement parts.

Figure 2:
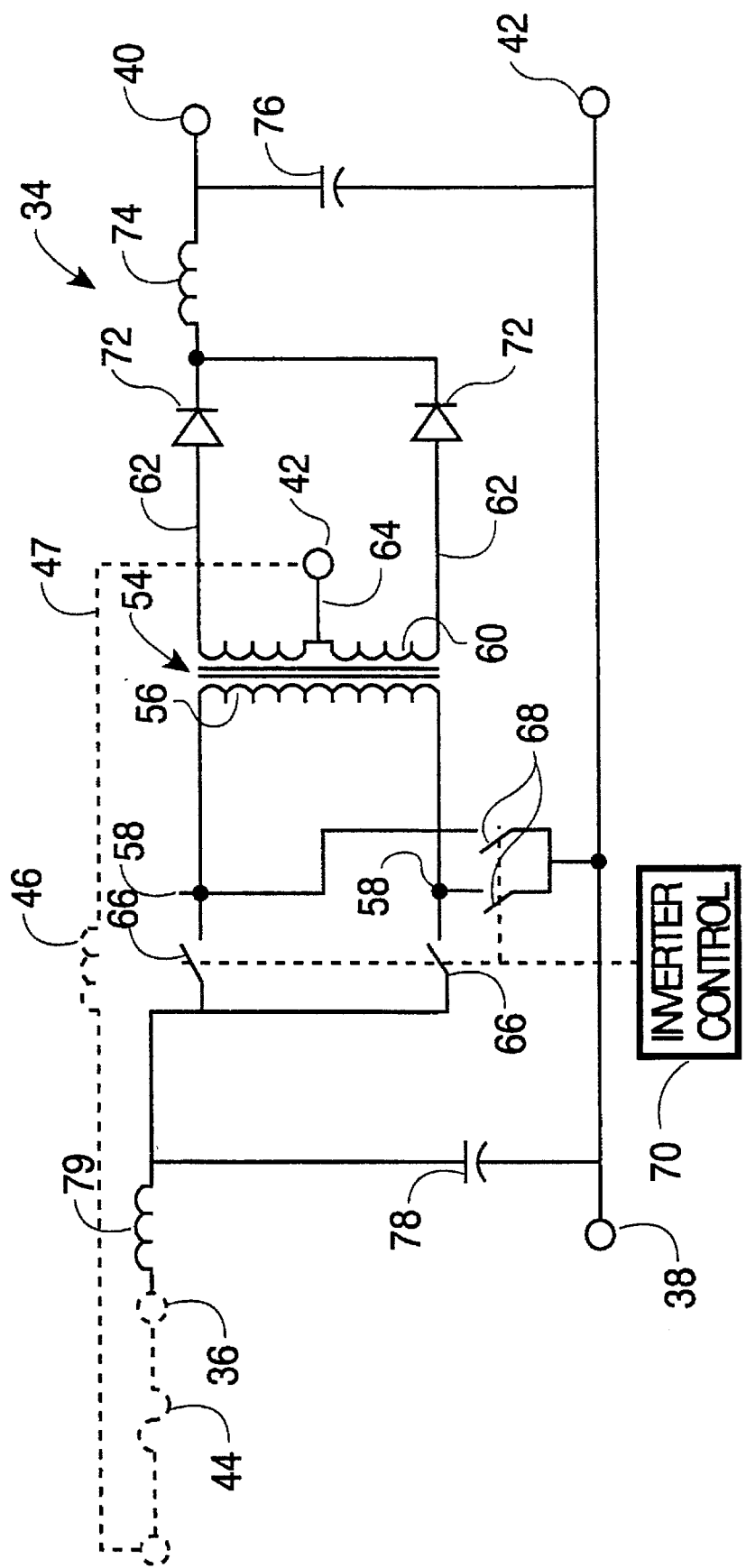
FIG. 2 shows a schematic diagram of a power converter according to the invention.

FIG. 2 shows an example of a suitable power converter topology that has worked effectively in practice. The power converter 84 includes the hot input 36, return input 88, hot output 40, and return output 42 previously discussed. A transformer 54 has a primary winding 56 with two inputs 58 and a secondary winding 60 with two outputs 62 and a center tap 64. A first pair of switches 66 is connected between respective primary winding inputs 58 and the hot input 86. A second pair of switches 68 is connected between respective primary winding inputs 58 and the return input 88. The switches 66, 68 can be any electrically controllable switch having a suitable rating, such as field effect transistors. The switches 66, 68 are connected to be operated by an switch control, such as an inverter control 70. The inverter control is adapted for alternately closing one of each pair of switches 66, 68 to alternately connect the hot input 36 and return input 38 to opposite inputs 58 of the primary winding. Thus, the inverter control 70 and switches 66, 68 invert direct current at the converter inputs 36, 38 to provide alternating current to the primary winding 56 thereby inducing alternating current in the secondary winding 60.

A pair of rectifiers 72, such as power diodes, are connected between the secondary outputs 62 to provide pulsating direct current. An LC filter including an inductor 74 and a capacitor 76 is connected to the rectifiers to provide relatively smooth direct current at the hot output 40. An LC filter 78, 79 is also provided at the inputs 86, 88. The output voltage at the hot output 40 depends on the input voltage at the hot input 86, the transformer configuration, and the wave form created by the inverter control 70 and switches 66, 68. The inverter can be adjusted to provide different output voltages. The converter power rating depends on input voltage, output voltage, and converter current limit.

The center tap 64 is connected to the return output 42. The return output is so-called because it can be connected as a return for current supplied by the hot output 40, as shown for the low voltage bus regulator 52 in FIG. 1. However, in the battery charger 32 and high voltage ;bus regulator 48 of FIG. 1, the return output 42 is connected to the hot input 36 through the inductor 46 in the bypass loop 47 and, preferably, the fuse 44.

In operation, the solar array 18 charges the battery 24 through the battery charger 32. The battery 24 supplies power to the loads 28, 30 through the high and low voltage bus regulators 48, 52. The battery charger 32 and regulators 48, 52 provide desired voltage conversion, regulation, and isolation of the buses 12, 14, 16.

A portion of the power through the battery charger 32 and high voltage regulator 48 bypasses the converter 34 through the bypass loop 47. The inductor 46 filters alternating current to prevent oscillations when the converters 34 are cascaded as shown.

The inverter control 70 of the battery charger 32 can control the switches 66, 68 to short the solar array 18, thereby bucking the array voltage to maintain a desired voltage at the battery bus 12 The converter 34a of the battery charger can also be used to boost the array voltage for charging above the open circuit voltage of the array up to the sum of the array voltage and converter voltage. When the converter 34a is not operating, the array voltage is clamped at the battery voltage and rises with the battery voltage to the open circuit voltage of the array 18. The battery charger 32 is controlled to provide a constant current to the battery bus 12.

The high voltage bus regulator 48 boosts the battery bus voltage, when necessary, to maintain 120±3 volts at the high voltage bus 14. As an orbit progresses, the power processed by the converter 34a of the battery charger 32 increases as the battery is charged and the battery voltage increases. Accordingly, the power processed by converter 34b of the high voltage regulator 48 decreases as the battery voltage increases. Thus, the total losses of the converters 34a, 34b are relatively constant and substantially less than the losses for two converters processing full power. The constant losses provide constant loading for cooling systems. Since only a fraction of the power is processed through the converters, smaller converters can be used than would be required for full power processing. The fuses 44 are connected to remove the converters 34a, 34b from the system 10 if necessary. If the converters 34a, 34b are removed, the system 10 remains operational without the regulation provided by the converters.

The low voltage bus regulator 52 is not series connected to provide full isolation from the high voltage bus 14. The converter 34c of the low voltage regulator 52 processes full power to provide regulated 28 volts at the low voltage bus 16.

The present disclosure describes several embodiments of the invention, however, the invention is not limited to these embodiments. Other variations are contemplated to be within the spirit and scope of the invention and appended claims.

What is claimed is:

1. A power supply system comprising:

an input bus;

an output bus;

a return, said system being adapted for having a load connected between said output bus and said return;

a power converter, comprising a transformer, having a hot input connected to the input bus, a hot output connected to said output bus, a return input connected to said return, and a return output;

a bypass loop connecting the return output to the input bus;

a first pair of switches adapted for alternately connecting the hot input to the inputs of the transformer;

a second pair of switches adapted for alternately connecting the return input to the inputs of the transformer; and an inverter control adapted for alternately closing one of each pair of said switches to alternately connect the hot input and return output to opposite inputs of said transformer.

2. A power supply system comprising:

a solar array adapted for supplying direct current at a hot output and having another output defining a return;

a battery charger including a first converter, a hot input of the first converter being connected to the hot output of said solar array through a first fuse and a return input of the first converter being connected to the return; and an inductor connected between a return output of the first converter and the hot input of the first converter;

a battery connected between the return and a hot output of the first converter through a second fuse;

a high voltage bus regulator including a second converter, a hot input of the second converter being connected to the hot output of the first converter through a third fuse and a return input of the second converter being connected to the return; and an inductor connected between a return output of the second converter and a hot input of the second converter; said high voltage bus regulator being adapted for supplying through a fourth fuse a load connected across the hot output of the second converter and the return; and a low voltage bus regulator including a third converter, a hot input of the third converter being connected to the hot output of the second converter through the fourth fuse and a return input of the third converter being connected to the return; said low voltage bus regulator being adapted for supplying a load connected across the hot and return outputs of the third converter;

wherein said first, second, and third converters are substantially identical and comprise a transformer having a primary winding with two inputs and a secondary winding with two outputs and a center tap; a hot input connection; a return input connection; an input LC filter connected to the input of said transformer; a first pair of switches adapted for alternately connecting the hot input connection to the inputs of the primary winding; a second pair of switches adapted for alternately connecting the return input connection to the inputs of the primary winding; an inverter control adapted for alternately closing one of each pair of switches to alternately connect the hot input and return input to opposite inputs of the primary winding; a pair of rectifiers connected between respective outputs of the secondary winding; an inductor connected between an output connection and the rectifiers; and an output filter capacitor connected across the output connection and the return input.

3. A regulator comprising:

a converter, comprising a transformer, having a hot input connection;

a return input connection;

a hot output connection;

a return output connection;

a bypass loop connecting the return output to the hot input connection;

a first pair of switches adapted for alternately connecting the hot input connection to inputs of the transformer;

a second pair of switches adapted for alternately connecting the return input connection to the inputs of the transformer; and an inverter control adapted for alternately closing one of each pair of switches to alternately connect the hot input and return input to opposite inputs of the transformer.

4. A regulator comprising:

a transformer having a primary winding with two inputs and a secondary winding with two outputs and a center tap;

a hot input connection;

a return input connection;

an input filter capacitor connected across said hot input and said return input connect ions:

a first pair of switches adapted for alternately connecting said hot input connection to the inputs of the primary winding;

a second pair of switches adapted for alternately connecting said return input connection to the inputs of the primary winding;

an inverter control adapted for alternately closing one of each pair of switches to alternately connect said hot input and said return input to opposite inputs of the primary winding;

a pair of rectifiers connected between respective outputs of the secondary winding;

an inductor connected between an output connection and the rectifiers;

an output filter capacitor connected across the output connection and said return input; and a second inductor connected in a bypass loop between the hot input connection of the primary winding and the center tap.

* * * * *